Sept. 27, 1966 M. CHERNACK 3,274,875
APPARATUS FOR SELECTIVELY REMOVING TOOTHED
PORTIONS OF A TOOTHED CAM
Filed Aug. 28, 1964 3 Sheets-Sheet 1

INVENTOR.
MILTON CHERNACK
BY
Raymond R. Skolnick

INVENTOR.
MILTON CHERNACK

BY
Raymond R. Skolnick

Sept. 27, 1966  M. CHERNACK  3,274,875
APPARATUS FOR SELECTIVELY REMOVING TOOTHED
PORTIONS OF A TOOTHED CAM
Filed Aug. 28, 1964  3 Sheets-Sheet 3
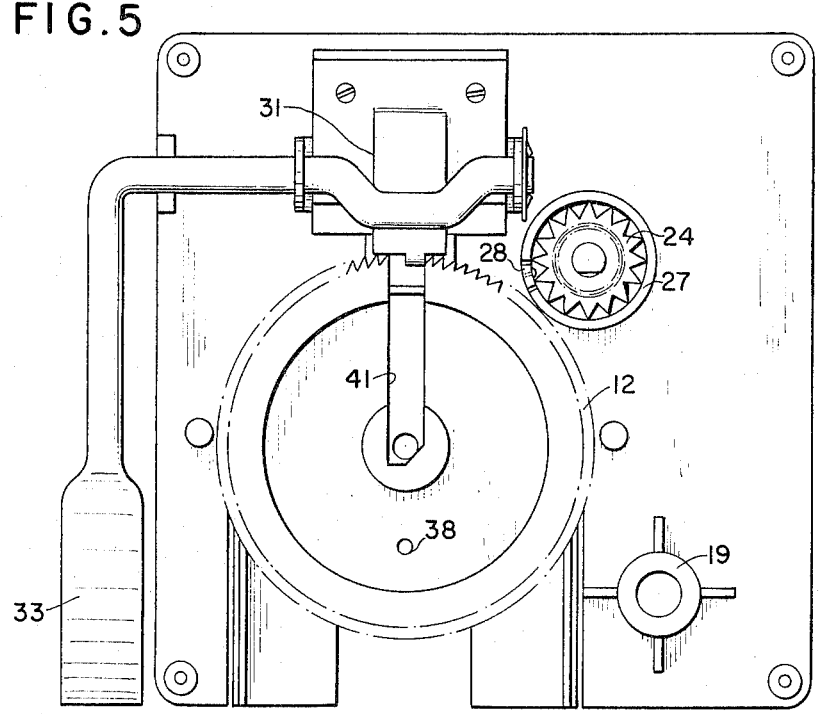
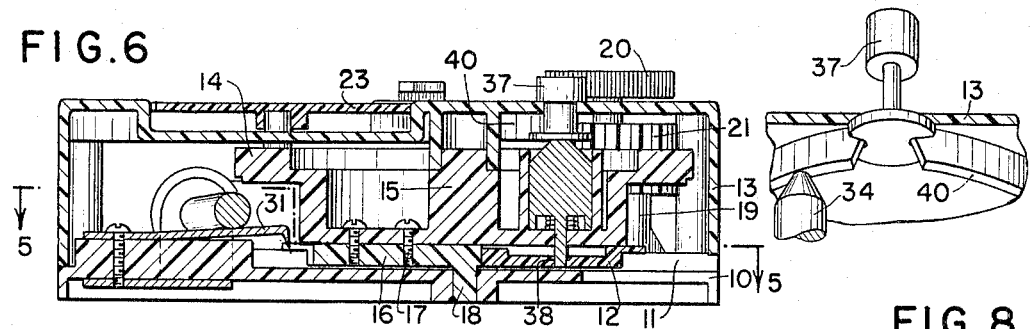
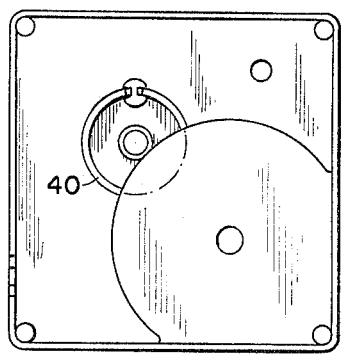
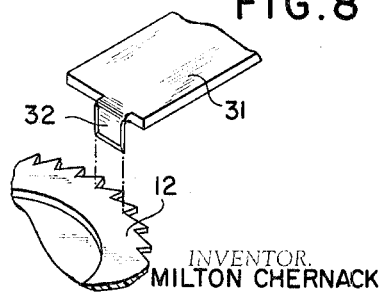
INVENTOR.
MILTON CHERNACK
BY Raymond R. Skolnick

United States Patent Office 3,274,875
Patented Sept. 27, 1966

3,274,875
APPARATUS FOR SELECTIVELY REMOVING TOOTHED PORTIONS OF A TOOTHED CAM
Milton Chernack, West Hempstead, N.Y., assignor to Prestodial Inc., Manhattan County, N.Y.
Filed Aug. 28, 1964, Ser. No. 392,783
2 Claims. (Cl. 83—411)

This invention relates in general to programming devices and more particularly to a programming device for programming a toothed cam as shown in abandoned design patent application Serial Number 79,347, filed on April 6, 1964, entitled, "Design of a Toothed Cam."

Heretofore, the methods employed for programming a toothed cam have been hand filing of the teeth, breaking the teeth off with pliers or cutters and other types of similar hand operations. There have also been complex devices employed for automatically programming a toothed cam.

It is therefore an object of this invention to provide a device for programming a toothed cam.

Another object of this invention is to provide a device where the programming is selected by dialing a number.

A still further object of this invention is to provide a simple foolproof economical, easy to maintain automatic programming device for a toothed cam.

To these ends the invention contemplates the use of a dial for selecting the programming sequence. This is done after the toothed cam is inserted into the programming mechanism. As each number of the programming sequence is dialed the toothed cam is positioned by means of suitable gearing to a position corresponding to the dialed number. A cutter or shearing knife is employed to cut off a selected number of teeth from the toothed cam at each of the selected positions.

The toothed cam is for use as a memory device in automatic telephone dialing equipment. This type of memory device is more fully explained in pending patent application Serial Number 287,856, filed on June 14, 1963, entitled, "Automatic Dialing Device."

The invention has other objects and advantages which will appear from the following description of a particular embodiment of the invention in conjunction with the accompanying drawings, in which:

FIG. 5 is a top sectional view of the invention taken along line 5—5 of FIG. 6;

FIG. 6 is a side sectional view of the invention taken along line 6—6 of FIG. 2;

FIG. 7 is a view of the underside of the cover taken along line 7—7 of FIG.3;

FIG. 8 is a fragmentary isometric view of the cutter; and

FIG. 9 is a fragmentary isometric view of the underside of the top cover showing the riding ridge of the toothed cam locking mechanism.

Figure 1:
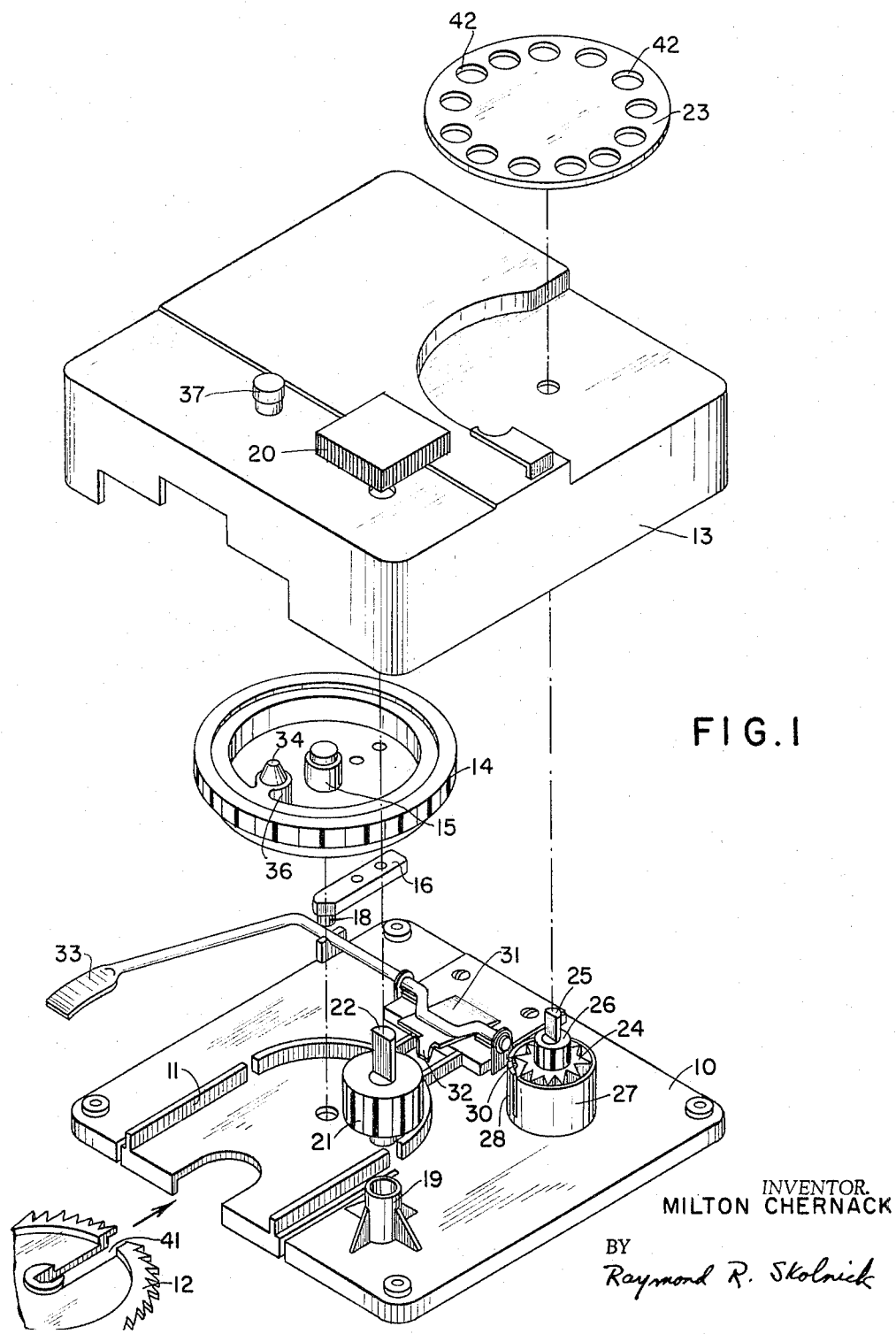
FIG. 1 is an exploded isometric view of the invention.
Figure 2:
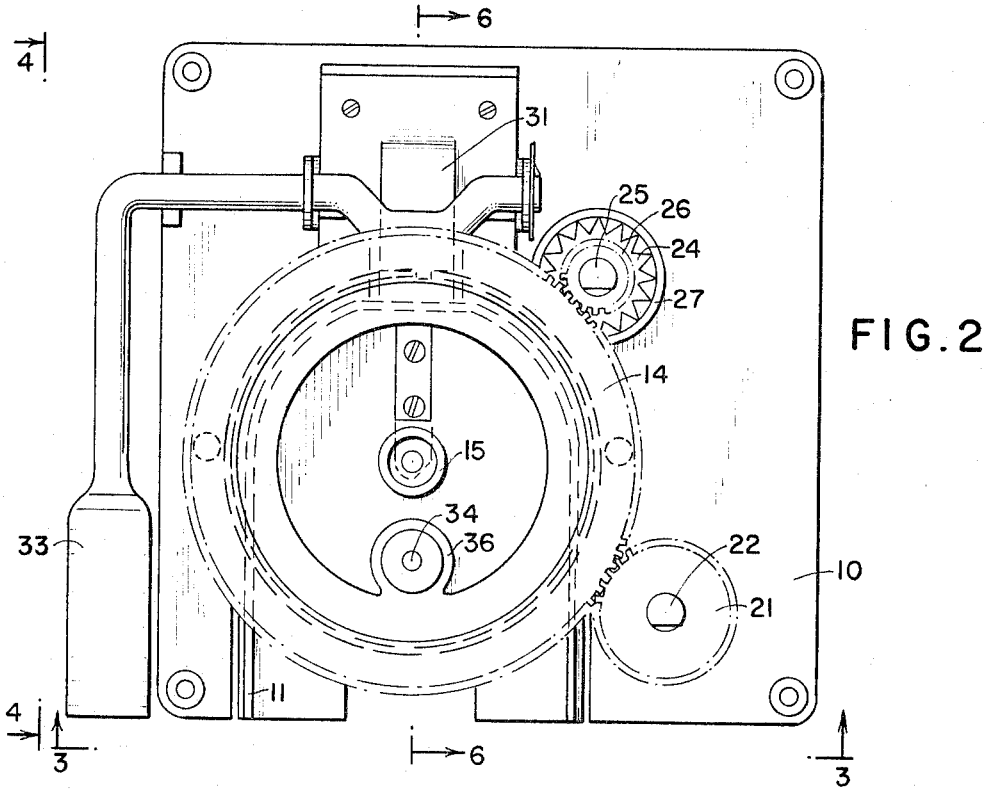
FIG. 2 is a top view of the invention with the cover of the case removed.
Figure 3:
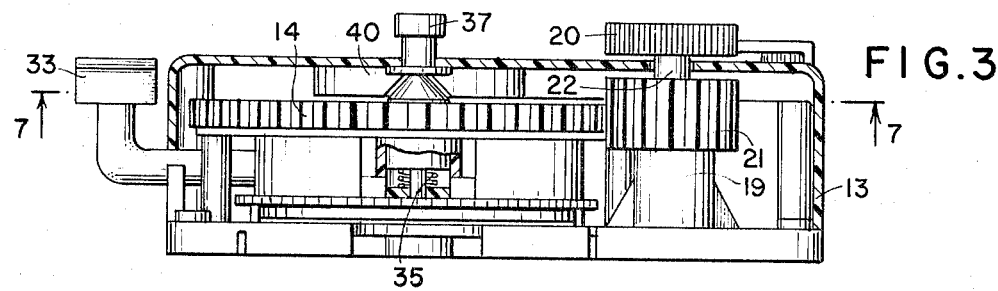
FIG. 3 is a front elevational view of the invention taken along line 3—3 of FIG. 2.
Figure 4:
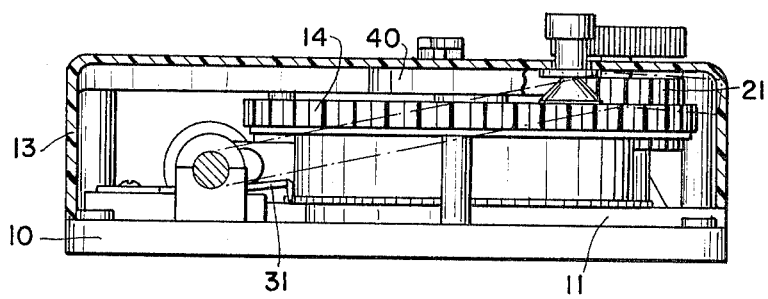
FIG. 4 is a side elevational view of the invention taken along line 4—4 of FIG. 2.

With reference to the drawings the particular embodiment shown there of the invention comprises, in general, a base plate 10, which has a nesting ridge 11 affixed thereto. The nesting ridge is used as a guide for guiding a toothed cam 12 into a correct programming position. A cover 13 is mounted over the base plate, thereby, providing a case for the programming mechanism.

A main gear 14 is mounted between the cover and base plate by means of stud 15 and shaft 18 of guide 16. Guide 16 is fastened to the underside of main gear 14 by means of two screws 17. A pinion gear 21 which mates with main gear 14, is held in rotatable position by means of bearing 19. Bearing 19 is affixed to base plate 10. A square knob 20 is attached to gear 21 by means of gear shaft 22 which extends through cover 13.

A dial 23 is attached to ratchet gear 24 by means of ratchet gear shaft 25 which extends through the cover 13. The ratchet gear has gear teeth 26 which mate with the teeth of main gear 14. The ratchet gear is nested within a sleeve 27 which is affixed to base plate 10. There are two slots cut in sleeve 27 forming a tongue 28 which has a tit 30. The tit is in the plane of the ratchet teeth thereby keeping the ratchet gear in rotational position unless acted upon by the rotation of the dial 23.

Attached to the rear of the base plate is a spring knife 31 which has a cutting and shearing blade 32. The width of the blade is the width of two of the teeth of the toothed cam 12. The cutting and shearing blade is also sharpened on the edges whereby it can shear off teeth from the toothed cam when the blade is held in a depressed position and the toothed cam is rotated. A lever 33 is employed for depressing the spring knife 31.

A detent pin 34 which is spring biased by spring 35 is mounted within sleeve guide 36. The sleeve guide is attached to main gear 14. A button 37 is employed for initially depressing the detent pin. When the detent pin 34 is depressed it fits into a hole 38 which is provided by the toothed cam 12. As the toothed cam is rotated the detent pin is kept depressed by the ridge 40 which is on the underside of cover 13.

The operation of the invention will now be explained to indicate how the parts enumerated above operate together to perform a useful function in a new and novel manner.

When it is desired to program a toothed cam as a memory device for use in an automatic telephone dialing device a toothed cam is inserted into the nesting ridge 11. Guide 16 fits into a slot 41 which is in the toothed cam. The toothed cam is now in the correct position for the programming operation to commence.

The button 37 is depressed which in turn depresses detent pin 34 so that the detent pin fits into the hole 38 of the toothed cam. Thus, the toothed cam is locked in its position. The button is held depressed until the first number to be programmed is dialed otherwise the detent pin would come out of the hole 38. After the first number is dialed the detent pin is held in a depressed position by means of the ridge 40. The ridge keeps the detent pin depressed until the toothed cam is rotated into its original position at which point the spring biasing the detent pin urges the pin into its upright position thereby releasing the toothed cam.

The dial 23 has holes 42 therein corresponding to holes in the dialing mechanisms of standard telephones. When the dial 23 is turned the ratchet gear 24 turns through a similar angle. The position of the dial 23 is maintained by means of the tit 30 on the tongue 28.

As ratchet gear 24 is turned the gear teeth 26 on the ratchet gear turns main gear 14. The gear ratio between gear teeth 26 and the teeth of main gear 14 is such that the turning of the dial through one hole will turn the toothed cam through one tooth. If it is desired to have four teeth remain as the memory on the toothed cam the dial is turned through six holes, since the knife blade 32 cuts off two teeth at a time, whereby teeth five and six are cut off.

If the memory desired to be programmed on to the toothed cam is five-six-nine then the first number dialed is five which is designated by hole number seven. After the number five is dialed the lever 33 is depressed and the knife blade 32 will cut off teeth number six and seven. The next number six is now dialed by turning the dial through hole number eight. The knife blade 32 is again depressed by lever 33 and teeth number fourteen and fifteen are cut off. The next number nine is now dialed by turning the dial through hole number eleven. The lever 33 is once more depressed and teeth twenty four and twenty five are cut off. Since no more teeth are needed as part of the programmed memory the lever 33 is held in the depressed position. Knob 20 is now turned which rotates pinion gear 21. Pinion gear 21 rotates main gear 14 which in turn rotates the toothed cam 12. Since the knife blade is in the depressed position the rotation of the toothed cam shears off the remaining teeth on the toothed cam against the edge of the knife blade.

When the toothed cam returns to its original position the detent pin 34 is biased to its upright position by means of spring 35 thereby lifting the button 37. The lifting of the button 37 indicates to the operator that the toothed cam has been returned to its original position. The toothed cam is now removed from the programmer and the programmer is now ready to receive other toothed cams which are desired to be programmed.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. A programming device comprising, a base plate, a cover mounted above said plate, a main gear mounted for rotation between said base plate and said cover, a pinion gear in meshing relationship with said main gear mounted for rotation between said base plate and said cover, a means for rotating said pinion gear, a ratchet gear mounted for rotation between said base plate and said cover said ratchet gear having regular gear teeth in meshing relationship with said main gear, a dial attached to said ratchet gear for sequentially positioning a toothed cam, a knife blade attached to said plate, said blade being positioned over the teeth of said toothed cam and a lever attached to said base plate and positioned over said knife blade whereby the activation of said lever depresses the knife blade so that the selected teeth of said toothed cam are cut off.

2. A programming device comprising, a base plate, a cover mounted above said plate, a main gear mounted for rotation between said base plate and said cover, a pinion gear in meshing relationship with said main gear mounted for rotation between said base plate and said cover, a means for rotating said pinion gear, a ratchet gear mounted for rotation between said base plate and said cover, a means affixed to said base plate for keeping said ratchet gear from turning freely, said ratchet gear having regular gear teeth in meshing relationship with said main gear, a dial attached to said ratchet gear for sequentially positioning a toothed cam, a detent pin mounted on said main gear for engagement with said toothed cam, a ridge affixed to the underside of said cover for said detent pin to ride on, a knife blade attached to said plate, said blade being positioned over the teeth of said toothed cam and a lever attached to said base plate and positioned over said knife blade whereby the activation of said lever depresses the knife blade so that the selected teeth of said toothed cam are cut off.

References Cited by the Examiner

UNITED STATES PATENTS

| | | | |
|---|---|---|---|
| 996,073 | 6/1911 | Freier | 83—267 X |
| 1,678,319 | 7/1928 | Blessing | 83—267 X |
| 2,044,527 | 6/1936 | Green | 83—411 |

ANDREW R. JUHASZ, *Primary Examiner.*

WILLIAM W. DYER, JR., *Examiner.*

F. T. YOST, *Assistant Examiner.*